United States Patent
Niewczas et al.

(10) Patent No.: US 12,418,322 B2
(45) Date of Patent: Sep. 16, 2025

(54) REDUCED INTERPATH INTERFERENCE FOR ULTRAWIDEBAND (UWB) WIRELESS COMMUNICATION

(71) Applicant: Qorvo US, Inc., Greensboro, NC (US)

(72) Inventors: Jaroslaw Niewczas, Jozefow (PL); Michael McLaughlin, Dublin (IE)

(73) Assignee: Qorvo US, Inc., Greensboro, NC (US)

( * ) Notice: Subject to any disclaimer, the term of this patent is extended or adjusted under 35 U.S.C. 154(b) by 180 days.

(21) Appl. No.: 18/216,124

(22) Filed: Jun. 29, 2023

(65) Prior Publication Data
US 2024/0014852 A1    Jan. 11, 2024

Related U.S. Application Data

(60) Provisional application No. 63/445,844, filed on Feb. 15, 2023, provisional application No. 63/358,576, filed on Jul. 6, 2022.

(51) Int. Cl.
*H04B 1/7176* (2011.01)
*H04B 1/7163* (2011.01)
*H04B 1/719* (2011.01)

(52) U.S. Cl.
CPC ......... *H04B 1/719* (2013.01); *H04B 1/71635* (2013.01); *H04B 1/7176* (2013.01)

(58) Field of Classification Search
CPC . H04B 1/00; H04B 1/69; H04B 1/713; H04B 1/715; H04B 1/717; H04B 1/719; H04B 1/07143; H04B 1/7176; H04B 1/71635; H04B 7/00; H04L 1/00; H04L 5/00; H04L 27/26; H04W 16/14; H04W 52/02; H04W 72/04; H04W 72/12; H04W 74/00; H04W 80/02
USPC ........ 370/310; 375/132, 138, 219, 260, 262, 375/267, 295, 316
See application file for complete search history.

(56) References Cited

U.S. PATENT DOCUMENTS

2019/0273636 A1*  9/2019  Batra .................... H04B 1/711

* cited by examiner

*Primary Examiner* — Shawkat M Ali
(74) *Attorney, Agent, or Firm* — Withrow & Terranova, P.L.L.C.

(57) ABSTRACT

Systems and methods for reduced interpath interference for ultrawideband (UWB) wireless communication are disclosed. In one aspect, a wireless communication device employs a systematic and non-random pulse-hopping scheme to introduce variable distances between pulses to reduce collision rates from interpath interference. In exemplary aspects, the scheme optimizes avoidance of collision rates for distances between paths of up to thirty nanoseconds (30 ns). The use of an optimized grid will be stable regardless of position of the user, thereby avoiding transmission drops and improving the user experience.

19 Claims, 7 Drawing Sheets

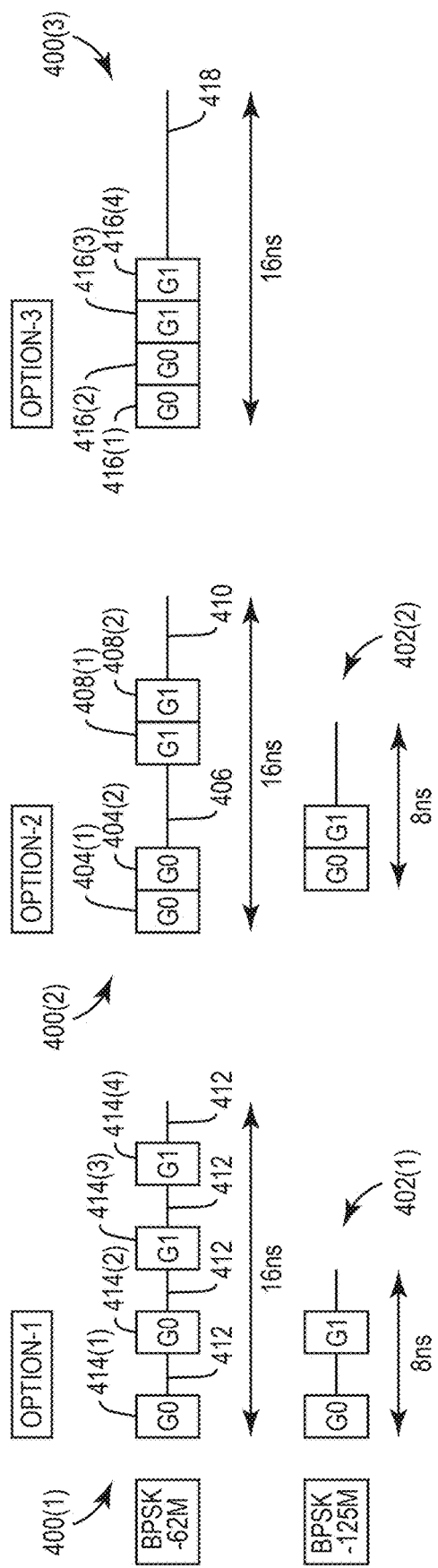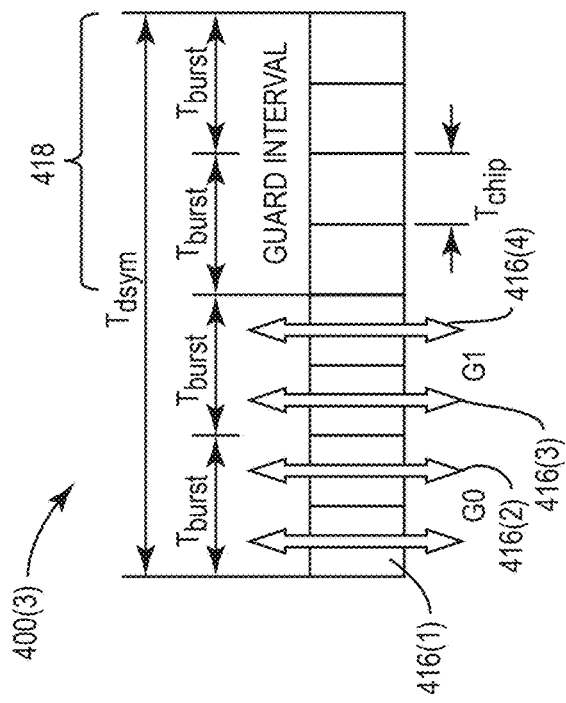
FIG. 4A
FIG. 4B

```
PATH-1@0ns:   AA----BB-CC-D--DEE----FF-GG-H--HII----JJ-KK-L--L      (collision rate with 0ns path: )
PATH-2@8ns:        AA----BB-CC-D--DEE----FF-GG-H--HII----JJ-KK-L--L   (50%)
PATH-2@16ns:            AA----BB-CC-D--DEE----FF-GG-H--HII----JJ-KK-L--L   (25%)
PATH-2@24ns:                 AA----BB-CC-D--DEE----FF-GG-H--HII----JJ-KK-L--L   (50%)
but:
PATH-2@12ns:         AA----BB-CC-D--DEE----FF-GG-H--HII----JJ-KK-L--L   (62%)
PATH-2@20ns:              AA----BB-CC-D--DEE----FF-GG-H--HII----JJ-KK-L--L   (62%)
```
↗ 700

REDUCED INTERPATH INTERFERENCE FOR ULTRAWIDEBAND (UWB) WIRELESS COMMUNICATION

PRIORITY APPLICATIONS

The present application claims priority to U.S. Provisional Patent Application Ser. No. 63/445,844 filed on Feb. 15, 2023, and entitled "REDUCED INTERPATH INTERFERENCE FOR ULTRAWIDEBAND (UWB) WIRELESS COMMUNICATION," the contents of which are incorporated herein by reference in its entirety.

The present application also claims priority to U.S. Provisional Patent Application Ser. No. 63/358,576 filed on Jul. 6, 2022, and entitled "HIGH-SPEED DATA-RATE TECHNIQUES TO REDUCE INTER-SYMBOL INTERFERENCE IMPACT," the contents of which are incorporated herein by reference in its entirety.

BACKGROUND

I. Field of the Disclosure

The technology of the disclosure relates generally to a reduced interference process for reducing interpath interference for IEEE 802.15.4z systems.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. The proliferation of mobile computing devices has also led to a variety of wireless standards that allow the mobile computing devices to communicate with one another. The Institute for Electrical and Electronics Engineers (IEEE) is a leading publisher of such standards, including emerging standards such as IEEE 802.15.4z. The relative newness of this standard provides room for innovation and improvement.

SUMMARY

Aspects disclosed in the detailed description include systems and methods for reduced interpath interference for ultrawideband (UWB) wireless communication. In particular, exemplary aspects of the present disclosure provide a systematic and non-random pulse-hopping scheme to introduce variable distances between pulses to reduce collision rates from interpath interference. In exemplary aspects, the scheme optimizes avoidance of collision rates for distances between paths of up to thirty nanoseconds (30 ns). When using an optimized grid, the transmission will be stable regardless of position of the user, thereby avoiding transmission drops and improving the user experience.

In this regard, in one aspect, a transceiver is disclosed. The transceiver includes a transmitter circuit configured to transmit a wireless signal through an antenna. The transceiver further includes a control circuit coupled to the transmitter circuit, the control circuit configured to apply a systematic and non-random pulse-hopping pattern to a symbol to be transmitted.

In another aspect, a mobile computing device is disclosed. The mobile computing device includes an antenna and a transceiver. The transceiver includes receive circuitry, transmit circuitry configured to transmit a wireless signal through an antenna, and a control circuit coupled to the transmit circuitry. The control circuit configured to apply a systematic, non-random pulse-hopping pattern to a symbol to be transmitted.

In another aspect, a method for transmitting a wireless signal is disclosed. The method includes receiving at a mobile computing device at least one systematic, non-random pulse-hopping pattern. The method further includes applying the at least one systematic, non-random pulse-hopping pattern to a symbol to be transmitted. The method additionally includes transmitting the symbol to a remote device.

BRIEF DESCRIPTION OF THE DRAWINGS

FIG. 4A is a block diagram showing options for higher-speed pulsing under IEEE 802.15.4z;

FIG. 4B is a timing diagram showing one of the options for higher-speed pulsing in FIG. 4A;

FIG. 7 is a timing diagram showing a first optimized fixed hopping grid collision rate according to an aspect of the present disclosure;

FIG. 8A is a fixed hopping grid for a first fast rate that provides a systematic, non-random pulse-hopping pattern according to another aspect of the present disclosure;

FIG. 8B is a fixed hopping grid for a second fast rate that provides a systematic, non-random pulse-hopping pattern according to another aspect of the present disclosure.

DETAILED DESCRIPTION

Figure 1:
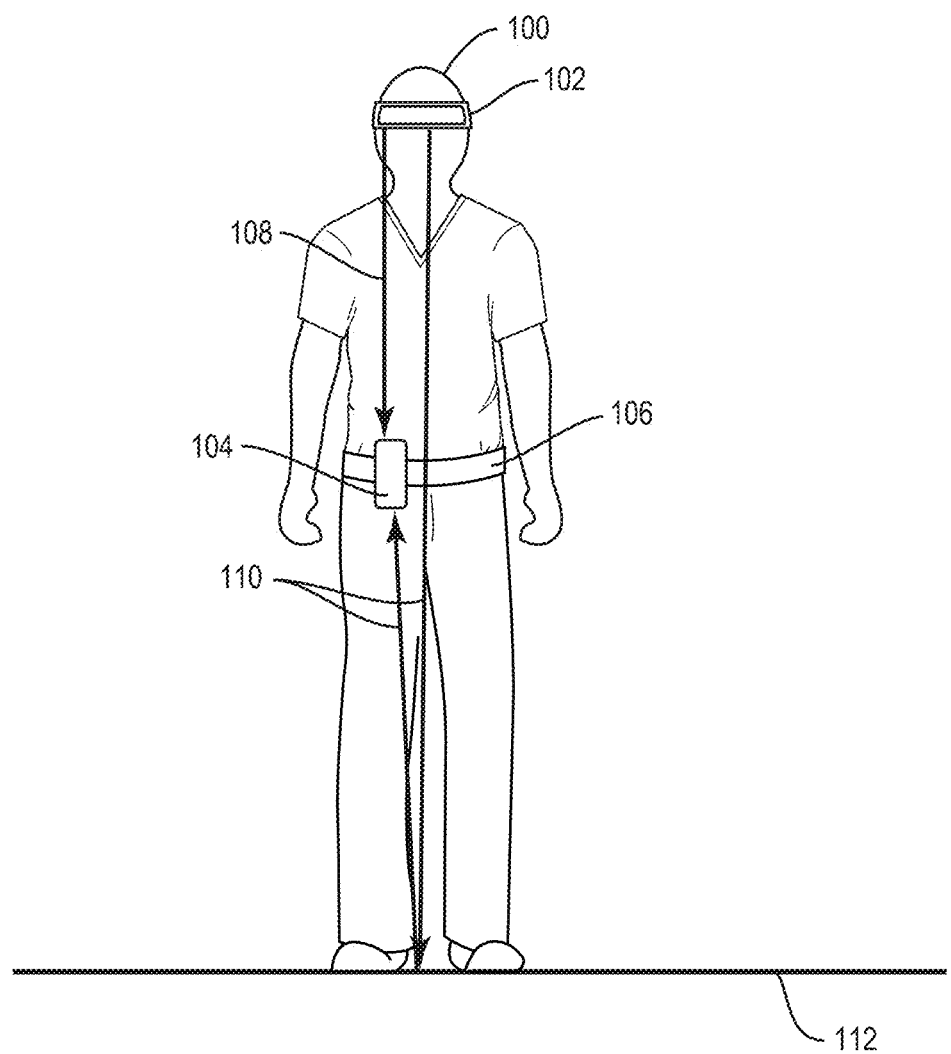
FIG. 1 is a stylized diagram of a user with multiple mobile computing devices that may communicate using ultrawideband (UWB) protocols.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for reduced interpath interference for ultrawideband (UWB) wireless communication. In particular, exemplary aspects of the present disclosure provide a systematic and non-random pulse-hopping scheme to introduce variable distances between pulses to reduce collision rates from interpath interference. In exemplary aspects, the scheme optimizes avoidance of collision rates for distances between paths of up to thirty nanoseconds (30 ns). The transmission using an optimized grid will be stable regardless of position of the user, thereby avoiding transmission drops and improving the user experience.

The Institute for Electrical and Electronic Engineers (IEEE) has published a variety of standards covering UWB wireless communication. Specifically (and as of this writing relatively recently), IEEE published IEEE 802.15.4z, which covers ways to allow communication in the UWB frequencies. Such UWB techniques are commonly used in low-power, short-range communication systems such as may be encountered in wearable devices such as are commonly referred to as Internet of Things (IoT) devices. While 802.15.4z has been published, 802.15.4ab is being proposed, and aspects of the present disclosure are also applicable to the newer iterations of the standard.

To assist in appreciating the context of the present disclosure, FIG. 1 is a stylized diagram of a user with multiple mobile computing devices that may communicate using ultrawideband (UWB) protocols. In particular, FIG. 1 illustrates a user 100 wearing a virtual reality headset 102 on their head and a mobile computing device 104 attached to a belt 106. The mobile computing device 104 may be a phone, a console handset, or the like. Relevant to later discussions, there is a first path 108 (i.e., the direct path) between the headset 102 and the mobile computing device 104. Likewise, there is a second path 110 (i.e., down to the ground 112 and reflected back up) between the headset 102 and the mobile computing device 104. As the second path 110 is longer than the first path 108, a first signal that travels on the first path 108 will arrive earlier than the same signal that travels on the second path 110. This time difference of arrival results in superposition of the later-arriving signal on the earlier-arriving signal. Absent correction, this superposition may result in destructive interference between the signals at the mobile computing device 104.

Figure 2:
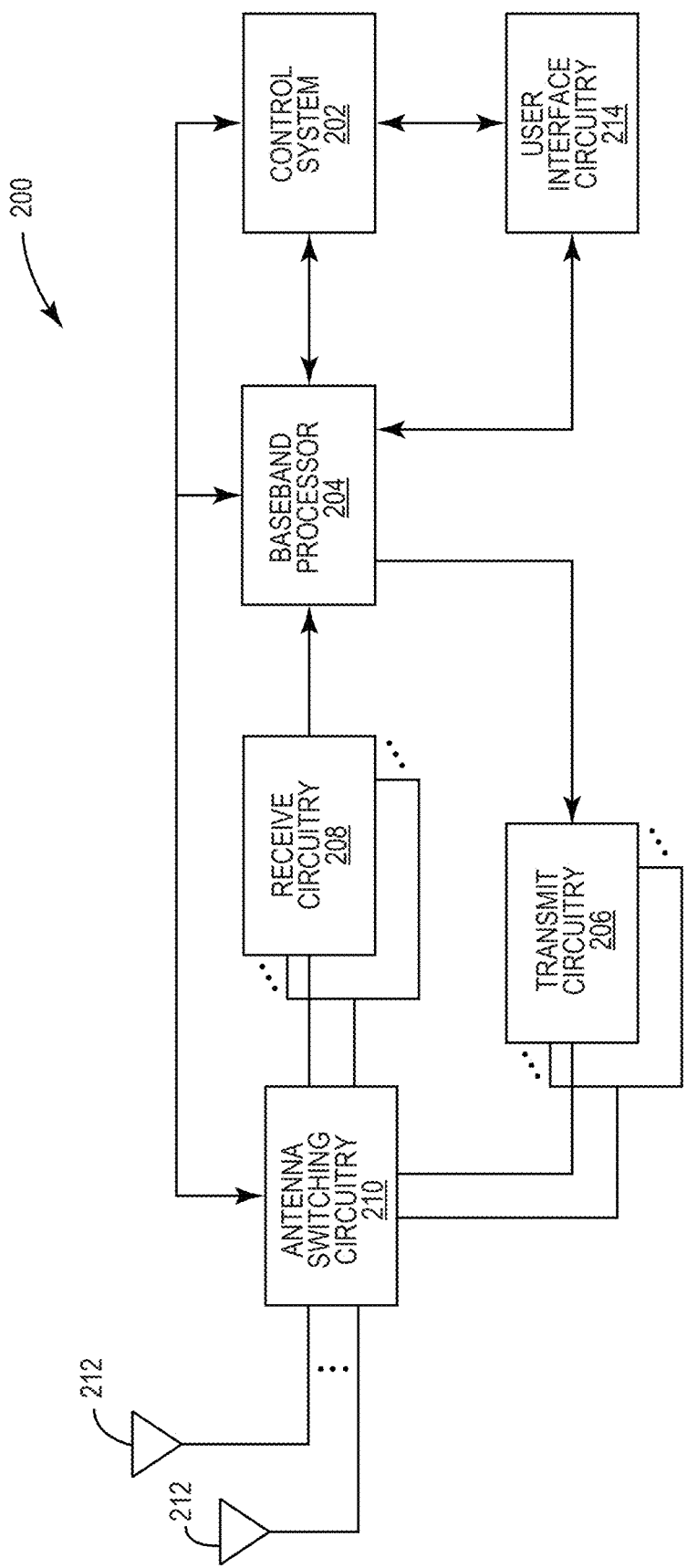
FIG. 2 is a circuit diagram of a transceiver that may be used in the mobile computing devices of FIG. 1.

FIG. 2 is a circuit diagram of a transceiver 200 that may be used in the mobile computing devices of FIG. 1. While two specific mobile computing devices are shown in FIG. 1, it should be appreciated that the mobile computing device 104, or the like, may be implemented in various types of user elements such as mobile terminals, smart watches, tablets, computers, navigation devices, access points, and like wireless communication devices that support wireless communications, such as cellular, wireless local area network (WLAN), Bluetooth, and near field communications. The transceiver 200 will generally include a control circuit 202, a baseband processor 204, transmit circuit 206, receive circuit 208, antenna switching circuit 210, multiple antennas 212, and user interface circuit 214. In exemplary aspects, the multiple antennas 212 may be a multi-antenna array and may be used for transmit diversity and/or multiple input-multiple output (MIMO) transmission schemes. As used herein, the multiple antennas 212 may be considered part of the transit circuit 206. In a non-limiting example, the control circuit 202 can be a field-programmable gate array (FPGA) or an application-specific integrated circuit (ASIC), as an example. In this regard, the control circuit 202 can include at least a microprocessor(s), an embedded memory circuit(s), and a communication bus interface(s). The receive circuit 208 receives radio frequency (RF) signals via the antennas 212 and through the antenna switching circuit 210 from one or more base stations. A low noise amplifier and a filter of the receive circuit 208 cooperate to amplify and remove broadband interference from the received signal for processing. Downconversion and digitization circuit (not shown) will then downconvert the filtered, received signal to an intermediate or baseband frequency signal, which is then digitized into one or more digital streams using an analog-to-digital converter(s) (ADC).

The baseband processor 204 processes the digitized received signal to extract the information or data bits conveyed in the received signal. This processing typically comprises demodulation, decoding, and error correction operations, as will be discussed in greater detail below. The baseband processor 204 is generally implemented in one or more digital signal processors (DSPs) and ASICs.

For transmission, the baseband processor 204 receives digitized data, which may represent voice, data, or control information, from the control circuit 202, which it encodes for transmission. The encoded data is output to the transmit circuit 206, where a digital-to-analog converter(s) (DAC) converts the digitally-encoded data into an analog signal, and a modulator modulates the analog signal onto a carrier signal that is at a desired transmit frequency or frequencies. A power amplifier will amplify the modulated carrier signal to a level appropriate for transmission and deliver the modulated carrier signal to the antennas 212 through the antenna switching circuit 210. The multiple antennas 212 and the replicated transmit and receive circuitries 206, 208 may provide spatial diversity. Modulation and processing details will be understood by those skilled in the art.

Figure 3:
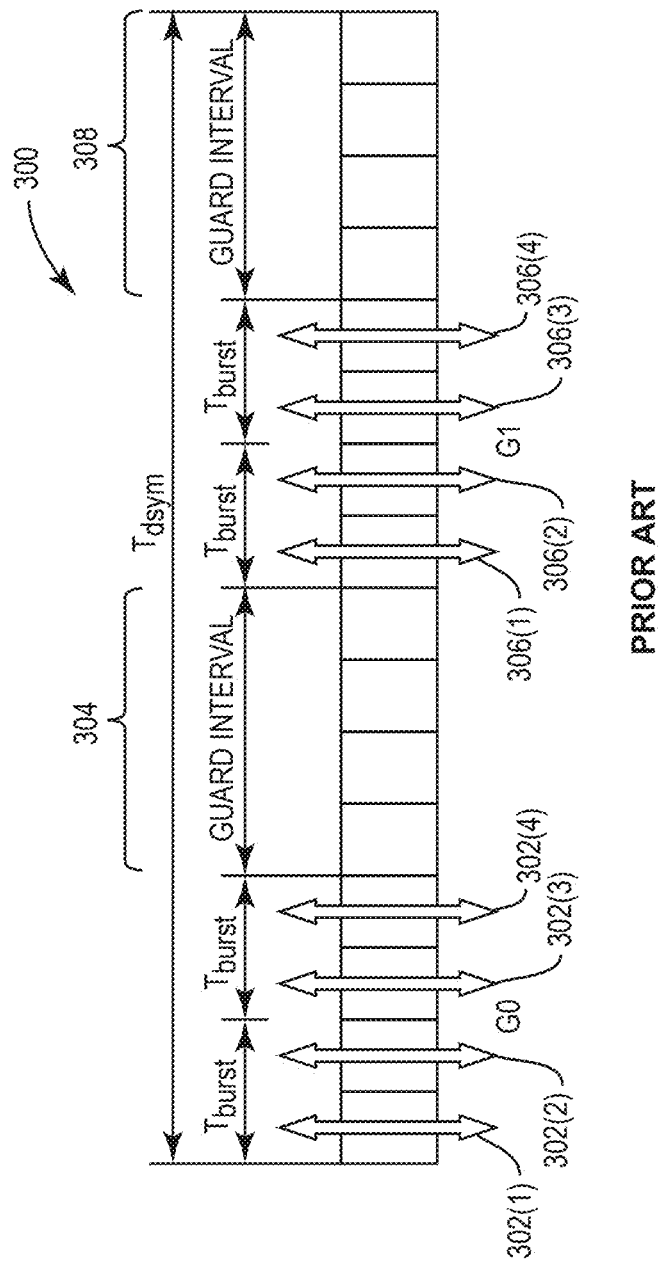
FIG. 3 is a timing diagram showing a symbol under a conventional pulse scheme under IEEE 802.15.4z.
Figure 5:
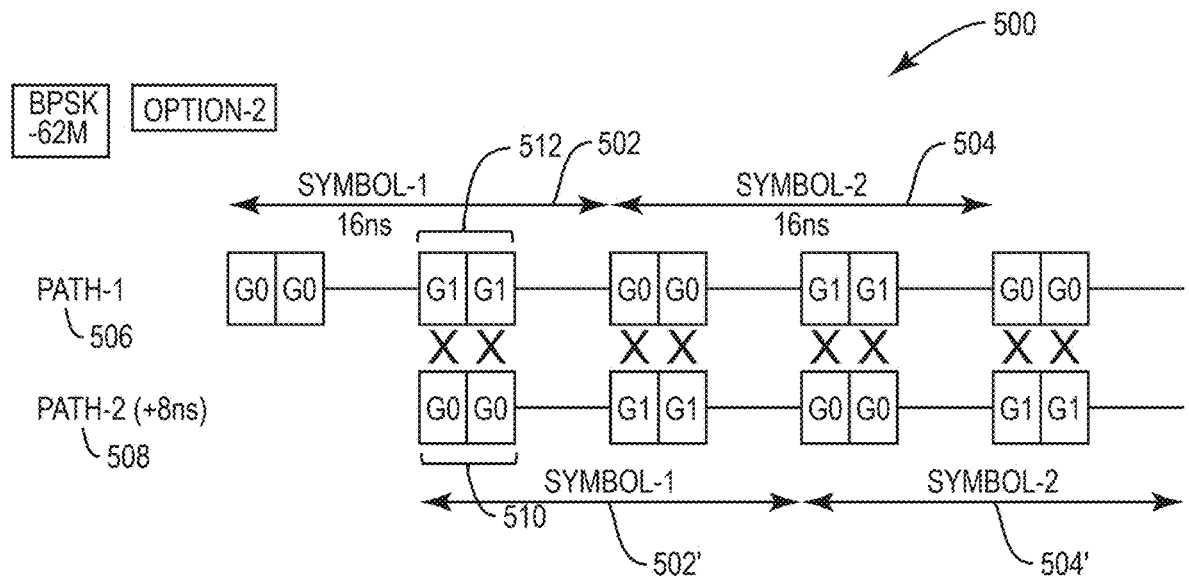
FIG. 5 is a block diagram showing how multi-path signals may interfere with one another in one of the higher-speed pulsing options of FIGS. 4A and 4B.

IEEE 802.15.4z has introduced a new pulse repetition frequency (PRF) 256 Megahertz (MHz)-based 31 megabits per second (Mbps) data mode. One symbol 300 illustrated in FIG. 3, represents one encoded data bit consisting of four encoded and scrambled G0 pulses 302(1)-302(4) (i.e., a transmit burst), followed by a silence gap 304 (also referred to as a guard interval), then encoded and scrambled G1 pulses 306(1)-306(4) (another transmit burst), and another silence gap 308 (another guard interval). The pulses 302(1)-302(4) are transmitted 2 ns apart. Similarly, the pulses 306(1)-306(4) are transmitted 2 ns apart. The silence gaps 304, 308 are each 8 ns, for a total symbol duration of 32 ns. The silence gap of 8 ns was chosen, in part, to provide protection against near multi-path reflections. With the relatively large pulse count (eight) and the silence gaps 304, 308, this scheme is robust and performs well for most multi-path conditions.

However, responding to the perceived need to provide ever-increasing bandwidth to convey data wirelessly, the IEEE presented the 802.15.4z standard, which caps at 31 Mbps and has recently proposed faster rates, including 62 Mbps and even 125 Mbps modes in 802.15.4ab. These faster rates may be implemented using binary phase shift keying (BPSK), and a number of pulses per symbol is reduced (assuming the same PRF of 256 MHz). It is anticipated that future standards may go even faster. While BPSK is specifically contemplated currently, there may be other encoding schemes such as quadrature phase shift keying (QPSK), quadrature amplitude modulation (QAM), or the like.

FIGS. 4A-6 show symbol schemes for higher-speed symbols under current proposals. Specifically, FIG. 4A shows three options 400(1)-400(3) for a 62 Mbps mode and two options 402(1)-402(2) for a 125 Mbps mode. The three options 400(1)-400(3) have symbols that last 16 ns while the two options 402(1)-402(2) have symbols that last only 8 ns. Within these shorter symbols, transmit bursts and guard intervals may be arranged in various configurations as shown. Thus, for example, option 400(2) has two encoded and scrambled G0 pulses 404(1)-404(2) (i.e., a transmit burst) followed by a silence gap 406, then two encoded and scrambled G1 pulses 408(1)-408(2) (another transmit burst), and another silence gap 410. In contrast, option 400(1) alternates a silence gap 412 between each pulse 414(1)-414(4), and option 400(3) groups all pulses 416(1)-416(4) together, followed by a long silence gap 418 (also illustrated in FIG. 4B).

Options 402(1)-402(2) with the shorter duration have fewer options but may, for example, separate the pulses with silence gaps (i.e., option 402(1)) or group the pulses (i.e., options 402(2)). It should be noted that other options, not illustrated, may also exist. (e.g., three pulses, one silence, one pulse, one silence, or the like).

In most environments, a signal being sent between a source and a receiver may experience multiple paths, typically caused by reflections (e.g., off walls, floors, trees, buildings, or the like). In the abstract, more reflections may improve the receiver's performance because there is more total energy impinging on the receiver antenna. This abstract concept is not always true. For example, in a situation where there are only two paths, both having similar power levels, if the path delay is a harmonic of the pulse rate and phase difference is close to zero or 180 degrees, then the pulses of such paths may collide or cause destructive interference. In the case of UWB and specifically in the 62 Mbps and 125 Mbps rates, a path delay of 8 ns, or a multiple thereof, is likely to cause problems. This destructive interference is shown by a timing diagram 500 in FIG. 5 using option 400(2).

Specifically, the timing diagram 500 has a first symbol 502 and a second symbol 504 on a first path 506. A second path 508 has a path delay relative to the first path 506 of 8 ns (i.e., time to travel the first path 506 is x, time to travel the second path 508 is x+8 ns). Thus, symbol 502' arrives 8 ns after symbol 502 arrives, and symbol 504' arrives 8 ns after symbol 504 arrives. The G0 pulses 510 of symbol 502' destructively interfere with the G1 pulses 512 of the symbol 502. This destructive interference continues for the other pulses because of the unfortunate superposition of the delayed signal on the second path 508.

Returning to FIG. 1, the mobile computing devices 102, 104 may typically have two paths having significant power, namely the paths 108 and 110. The path delay distance between the paths 108, 110 may be, for an average-sized human, about 2.4 meters (m). Coincidentally, 8 ns translates to about 2.4 m. Thus, a common use case provides the opportunity for this sort of destructive interference.

Figure 6:
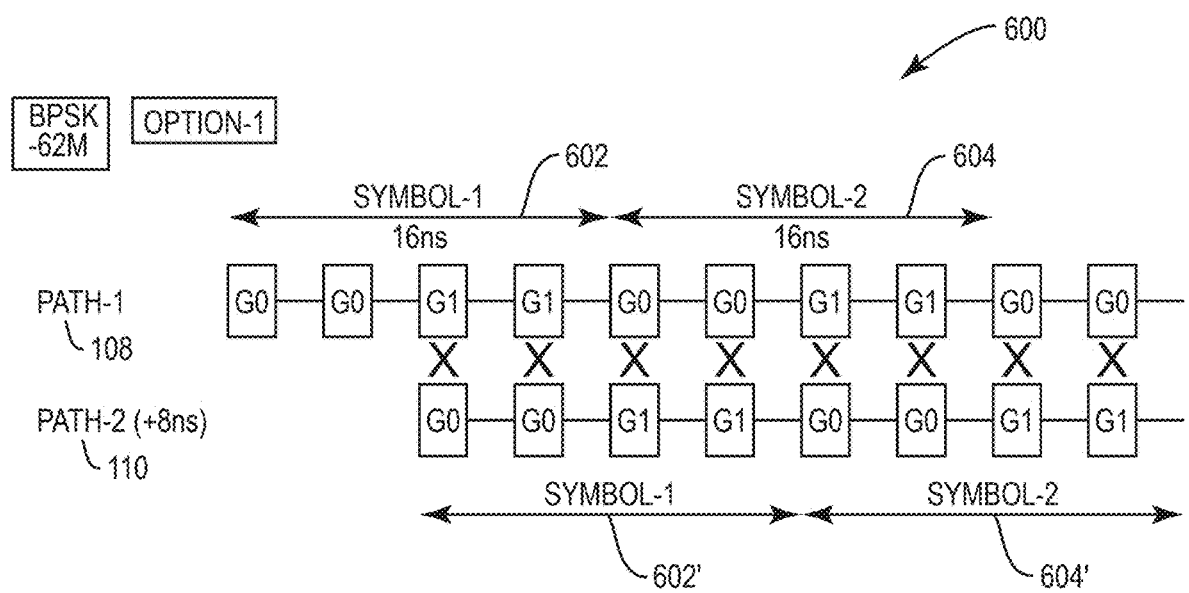
FIG. 6 is a block diagram showing how multi-path signals may interfere with one another in another one of the higher-speed pulsing options of FIGS. 4A and 4B.

It should be appreciated that this destructive interference is not limited to option 400(2). Indeed, as shown in FIG. 6, the destructive interference is readily seen for option 400(1). That is, timing diagram 600 shows a first symbol 602 and a second symbol 604, on the first path 108. The second path 110 has a first symbol 602' and a second symbol 604', which destructively interfere with the first symbol 602 and the second symbol 604. Note also that option 400(3) may also have interference if the paths are 16 ns apart. Such distance may occur when there is a reflection off a ceiling instead of a floor and remains common enough to cause problems. For the 125 Mbps rate, these path delays are more common.

Exemplary aspects of the present disclosure contemplate using pulse position hopping to minimize the impact of this predictable path delay. Furthermore, the pulse position hopping is systematic and non-random. Systematic, as used herein, is intended to mean purposeful and contemplates that the hopping is a periodic pattern. Further, it is expected that the periodic pattern has a fixed duration. Non-random in this context excludes random and pseudo-random hopping, such as was done in 802.15.4a. The decision to use a non-random pulse-hopping grid is based on the observation that random pulse-hopping can generate multiple identical hopping positions in a row, which will cause consecutive collisions and could result in decoding failure. Further, the hopping grid may be selected to minimize optimal pulse collisions up to about 30 ns. For path delays longer than this at UWB frequencies, there is not likely to be sufficient strength on the longer path to cause problems. However, the concepts set forth herein may be applied to other frequencies and thus may consider longer (or shorter) path delays. In exemplary aspects, the pattern may have a period of an integer multiple of a symbol length. While non-integer multiples could be used, current technology makes this difficult to implement and commercially impractical.

In a first aspect, a fixed grid hopping scheme may be chosen such that there are no consecutive 100% collisions at any of the selected delays between the reflected paths (i.e., 8 ns, 16 ns, or 24 ns). An exemplary grid that does this is G0G0----G1G1-G0G0-G1--G1. While minimizing collisions at the critical delays, there would be 62% collision rates at 12 ns and 20 ns, as shown in the timing diagram 700 of FIG. 7. This level of collision may be unacceptable for certain applications, and accordingly, an optimized grid may compromise to get an overall performance that meets design criteria.

In this regard, FIGS. 8A and 8B illustrate fixed pulse-hopping patterns 800 and 802, respectively, that have no "bad" path delays, but few non-zero collisions path delays up through about 30 ns (more precisely 32 ns, while 32 ns is contemplated, it should be appreciated that other values may be used). These patterns 800, 802 provide collision rates no higher than 50% for all delays between paths up to 30 ns. For 2 ns, 8 ns, 24 ns, and 30 ns, the collision rates are lower at 37%. Other optimized grids are also possible based on design criteria.

Figure 9:
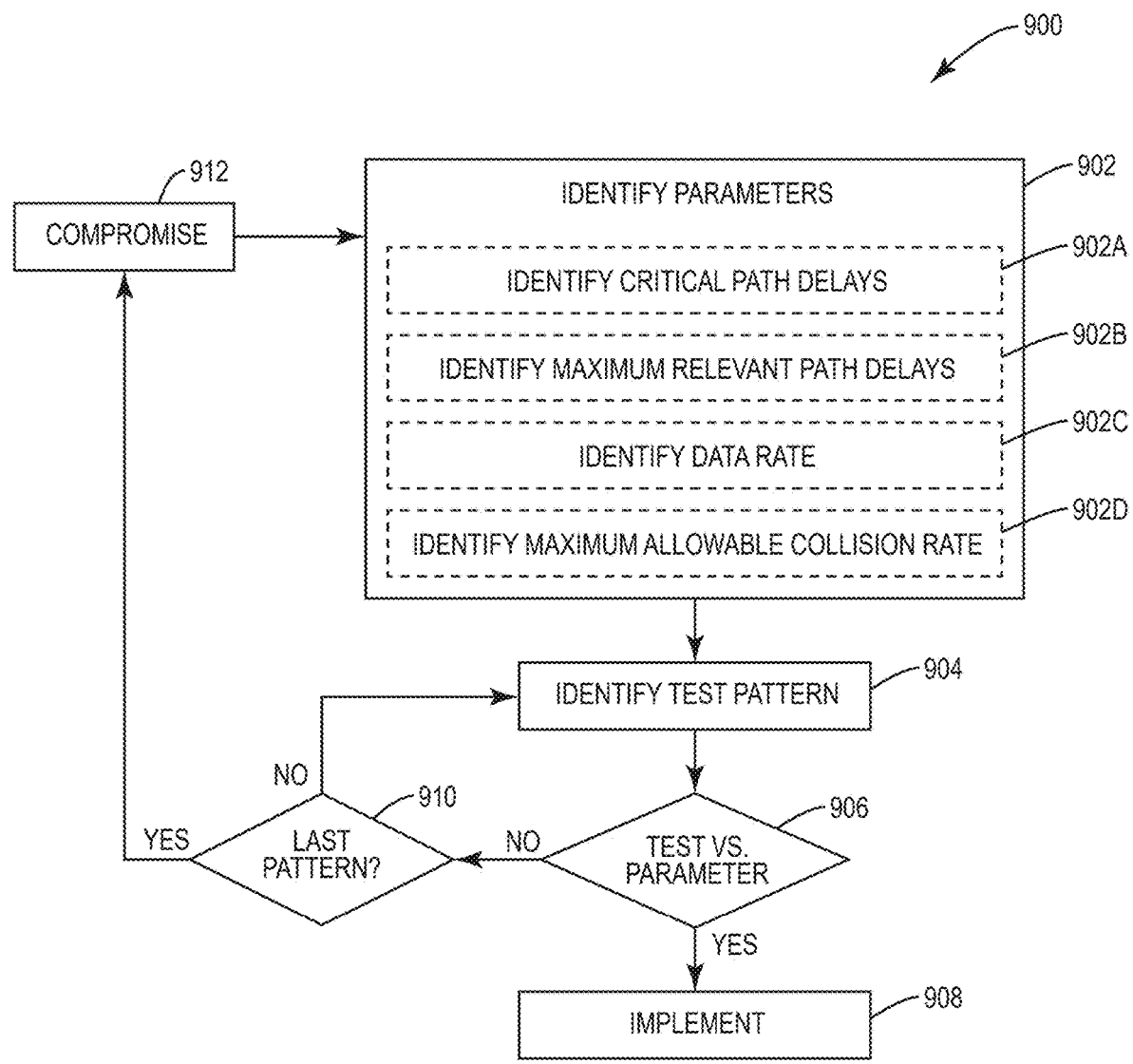
FIG. 9 is a flowchart illustrating an exemplary process for using systematic, non-random pulse-hopping patterns to avoid interpath interference according to the present disclosure.

FIG. 9 illustrates a process 900 for selecting an optimal systematic, non-random pulse-hopping grid or pattern. The process 900 begins by identifying parameters of interest (block 902). This may include identifying critical path delays (block 902A) (e.g., 8 ns, 16 ns); identifying maximum relevant path delays (block 902B) (e.g., ~30 ns); identifying a data rate (block 902C) (e.g., 62 Mbps or 125 Mbps); and identifying a maximum allowable collision rate (block 902D) (e.g., 50%). Other parameters may be related to the nature of the transmission. For example, if the transmit circuit 206 supports transmit diversity and/or MIMO schemes, it may be desirable to minimize collisions between different transmission streams from the different antennas 212. Different weights may be applied to these parameters, and the order in which they are identified may vary without departing from the present disclosure.

The process 900 continues by identifying a test pattern (block 904) from a set of patterns. There are a limited number of slots per symbol, so there are a finite set of possible patterns. This test pattern is then tested versus the identified parameters (block 906) to see if the pattern meets or satisfies the design criteria outlined by the parameters. That is, initially, the first systematic, non-random pulse-hopping pattern is tested to check to see if the pattern satisfies the identified parameters. If the pattern meets the design criteria, the pattern may be implemented (block 908). Optionally, because there may be multiple patterns satisfying the criteria in some cases, the process 900 may iterate through all options to find the "best" choice. In such instances, a designer could create some additional quality metric or ranking criteria that ranks the patterns that meet the basic design criteria to determine which is "best." The metric might be average collision rate across all delays, average collision range within a critical range of delays (e.g., 2-10 ns), or the like.

If, however, the pattern fails to meet the design criteria, the process 900 checks to see if this is the last available test pattern (block 910). If there are more test patterns, a new test pattern is chosen at block 904, and the process iterates. If this was the last test pattern, a compromise on the parameters is implemented (block 912), the parameters are re-weighted, and the process 900 is performed again.

While the process 900 is contemplated as being a static process, done perhaps by the manufacturer, it is also possible that the process 900 may be done, in part, dynamically. For example, a look-up table or the like may be used to store optimized patterns based on certain operating conditions, such as a difference between paths. The transmit circuit 206 could be used to get a channel estimate, including channel state and/or measured delays between different paths, measured path delay for a path between the antennas 212 and an expected receiver (e.g., the device 104) and a pattern selected based on channel state and/or the estimated/measured delays between paths of the channel state profile.

While the above disclosure has shown a G0/G1 mapping, it should be appreciated that this is used for convenience and to illustrate a convolutional encoder with a coding rate of ½ and is not intended to be limiting. For other encoders, like low-density parity check (LDPC) codes, the hopping scheme may remain the same, except that the pulses may represent different encoded bits.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A transceiver comprising:
   a transmitter circuit configured to transmit a wireless signal through an antenna; and
   a control circuit coupled to the transmitter circuit, the control circuit configured to: apply a systematic and non-random pulse-hopping pattern to a symbol to be transmitted.

2. The transceiver of claim 1, wherein the symbol to be transmitted comprises four pulses within eight nanoseconds (8 ns).

3. The transceiver of claim 1, wherein the symbol to be transmitted comprises eight pulses within sixteen nanoseconds (16 ns).

4. The transceiver of claim 1, wherein the systematic and non-random pulse-hopping pattern has a period being an integer multiple of a symbol length of the symbol to be transmitted.

5. The transceiver of claim 4, wherein the control circuit is configured to apply the systematic and non-random pulse-hopping pattern via pulses located on a one, two, or four nanosecond (ns) grid.

6. The transceiver of claim 1, wherein the systematic and non-random pulse-hopping pattern is optimized for a range of path delay differences, where a minimum of the range of path delay differences is based on a grid density, and a maximum range is less than or equal to a length of the systematic and non-random pulse-hopping pattern minus the grid density.

7. The transceiver of claim 6, wherein the systematic and non-random pulse-hopping pattern provides less than or equal to 50% collisions at all path delays in the range.

8. The transceiver of claim 1, where the transmitter circuit comprises a multi-antenna array and the systematic and non-random pulse-hopping pattern is optimized to minimize collisions between signals transmitted from different antennas in the multi-antenna array.

9. The transceiver of claim 1, wherein the control circuit is further configured to receive the systematic and non-random pulse-hopping pattern during manufacturing.

10. The transceiver of claim 1, wherein the control circuit is configured to store a plurality of optimized patterns.

11. The transceiver of claim 10, wherein the control circuit is configured to select an optimized pattern from the plurality of optimized patterns based on channel state or delays between paths.

12. The transceiver of claim 1, wherein the systematic and non-random pulse-hopping pattern is optimized for path delay differences less than a length of the systematic and non-random pulse-hopping pattern.

13. The transceiver of claim 1, wherein the systematic and non-random pulse-hopping pattern provides for fewer collisions at or below a threshold path delay, and wherein the threshold path delay is based on an application being used with the transmitter circuit.

14. A mobile computing device comprising:
an antenna; and
a transceiver comprising:
receive circuitry;
transmit circuitry configured to transmit a wireless signal through the antenna; and
a control circuit coupled to the transmit circuitry, the control circuit configured to:
apply a systematic and non-random pulse-hopping pattern to a symbol to be transmitted.

15. The mobile computing device of claim 14, further comprising one of a smartwatch, headset, tablet, and navigation device.

16. A method for transmitting a wireless signal, the method comprising:
receiving at a mobile computing device at least one systematic and non-random pulse-hopping pattern;
applying the at least one systematic and non-random pulse-hopping pattern to a symbol to be transmitted; and
transmitting the symbol to a remote device.

17. The method of claim 16, wherein the receiving the at least one systematic and non-random pulse-hopping pattern comprises receiving a plurality of systematic and non-random pulse-hopping patterns; and
storing the plurality of systematic and non-random pulse-hopping patterns.

18. The method of claim 17, further comprising getting a channel estimate including channel state, measured delays, or both.

19. The method of claim 18, further comprising selecting a chosen pattern from the plurality of systematic and non-random pulse-hopping patterns based on the channel estimate.

* * * * *